US007260631B1

(12) United States Patent
Johnson et al.

(10) Patent No.: US 7,260,631 B1
(45) Date of Patent: Aug. 21, 2007

(54) SYSTEM AND METHOD FOR RECEIVING ISCSI PROTOCOL DATA UNITS

(75) Inventors: Michael Ward Johnson, Livermore, CA (US); Andrew Currid, Alameda, CA (US); Mrudula Kanuri, Santa Clara, CA (US); John Shigeto Minami, Honolulu, HI (US)

(73) Assignee: NVIDIA Corporation, Santa Clara, CA (US)

( * ) Notice: Subject to any disclaimer, the term of this patent is extended or adjusted under 35 U.S.C. 154(b) by 589 days.

(21) Appl. No.: 10/741,681

(22) Filed: Dec. 19, 2003

(51) Int. Cl.
*G06F 15/173* (2006.01)
(52) U.S. Cl. ................................. 709/224
(58) Field of Classification Search ............. 709/224
See application file for complete search history.

(56) References Cited

U.S. PATENT DOCUMENTS

| 212,889 | A | 3/1879 | Bridenthal, Jr. |
| 4,807,111 | A | 2/1989 | Cohen et al. ............... 364/200 |
| 4,839,851 | A | 6/1989 | Maki .......................... 364/900 |
| 5,012,489 | A | 4/1991 | Burton et al. ................. 375/8 |
| 5,056,058 | A | 10/1991 | Hirata et al. ............... 364/900 |
| 5,161,193 | A | 11/1992 | Lampson et al. ............ 380/49 |
| 5,163,131 | A | 11/1992 | Row et al. .................. 395/200 |
| 5,307,413 | A | 4/1994 | Denzer ........................ 380/49 |
| 5,426,694 | A | 6/1995 | Hebert ....................... 379/242 |
| 5,430,727 | A | 7/1995 | Callon ..................... 370/85.13 |
| 5,440,551 | A | 8/1995 | Suzuki ......................... 370/60 |
| 5,455,599 | A | 10/1995 | Cabral et al. ............... 345/133 |
| 5,485,460 | A | 1/1996 | Schrier et al. ............. 370/94.1 |
| 5,495,480 | A | 2/1996 | Yoshida ....................... 370/60 |
| 5,499,353 | A | 3/1996 | Kadlec et al. .............. 395/445 |
| 5,513,324 | A | 4/1996 | Dolin, Jr. et al. ....... 395/200.18 |
| 5,519,704 | A | 5/1996 | Farinacci et al. ........ 370/85.13 |
| 5,544,357 | A | 8/1996 | Huei .......................... 395/600 |
| 5,546,453 | A | 8/1996 | Hebert ....................... 379/242 |
| 5,566,170 | A | 10/1996 | Bakke et al. ................. 370/60 |
| 5,577,105 | A | 11/1996 | Baum et al. .................. 379/93 |
| 5,577,172 | A | 11/1996 | Vatland et al. ............. 395/114 |

(Continued)

FOREIGN PATENT DOCUMENTS

AU    4595297    5/1998

(Continued)

OTHER PUBLICATIONS

Sataran et al. Internet Small Computer System Interface (iSCSI), RFC 3720, Apr. 2004, pp. 1-257.*

(Continued)

*Primary Examiner*—Zarni Maung
*Assistant Examiner*—Saket Daftuar
(74) *Attorney, Agent, or Firm*—Zilka-Kotab, PC (57) ABSTRACT

An Internet small computer system interface (iSCSI) system, method and associated data structure are provided for receiving data in protocol data units. After a protocol data unit is received, a data list is identified that describes how the data contained in the protocol data unit is to be stored (i.e. placed, saved, etc.) in memory (i.e. application memory). Further stored is a state of the data list. To this end, the state of the data list is used in conjunction with the storage of data from a subsequent protocol data unit.

27 Claims, 6 Drawing Sheets

U.S. PATENT DOCUMENTS

| | | | |
|---|---|---|---|
| 5,577,237 A | 11/1996 | Lin | 395/555 |
| 5,581,686 A | 12/1996 | Koppolu et al. | 395/340 |
| 5,596,702 A | 1/1997 | Stucka et al. | 395/340 |
| 5,598,410 A | 1/1997 | Stone | 370/469 |
| 5,619,650 A | 4/1997 | Bach et al. | 395/200.01 |
| 5,621,434 A | 4/1997 | Marsh | 345/145 |
| 5,625,678 A | 4/1997 | Blomfield-Brown | 379/93 |
| 5,625,825 A | 4/1997 | Rostoker et al. | 395/730 |
| 5,634,015 A | 5/1997 | Chang et al. | 395/309 |
| 5,636,371 A | 6/1997 | Yu | 395/500 |
| 5,640,394 A | 6/1997 | Schrier et al. | 370/389 |
| 5,650,941 A | 7/1997 | Coelho et al. | 364/514 |
| 5,663,951 A | 9/1997 | Danneels et al. | 370/230 |
| 5,664,162 A | 9/1997 | Dye | 345/521 |
| 5,666,362 A | 9/1997 | Chen et al. | 370/420 |
| 5,675,507 A | 10/1997 | Bobo, II | 364/514 |
| 5,678,060 A | 10/1997 | Yokoyama et al. | 395/831 |
| 5,680,605 A | 10/1997 | Torres | 395/603 |
| 5,687,314 A | 11/1997 | Osman et al. | 395/200 |
| 5,696,899 A | 12/1997 | Kalwitz | 395/200.1 |
| 5,699,350 A | 12/1997 | Kraslavsky | 370/254 |
| 5,701,316 A | 12/1997 | Alferness et al. | 371/53 |
| 5,727,149 A | 3/1998 | Hirata et al. | 395/200.8 |
| 5,734,852 A | 3/1998 | Zias et al. | 395/334 |
| 5,734,865 A | 3/1998 | Yu | 395/500 |
| 5,748,905 A | 5/1998 | Hauser et al. | 395/200.79 |
| 5,754,540 A | 5/1998 | Liu et al. | 370/315 |
| 5,754,556 A | 5/1998 | Ramseyer et al. | 371/10.3 |
| 5,761,281 A | 6/1998 | Baum et al. | 379/93.29 |
| 5,778,178 A | 7/1998 | Arunachalam | 395/200.33 |
| 5,790,546 A | 8/1998 | Dobbins et al. | 370/400 |
| 5,790,676 A | 8/1998 | Ganesan et al. | 380/23 |
| 5,802,287 A | 9/1998 | Rostoker et al. | 395/200.8 |
| 5,802,306 A | 9/1998 | Hunt | 395/200.58 |
| 5,805,816 A | 9/1998 | Picazo, Jr. et al. | 395/200.53 |
| 5,809,235 A | 9/1998 | Sharma et al. | 395/200.6 |
| 5,815,516 A | 9/1998 | Aaker et al. | 371/53 |
| 5,818,935 A | 10/1998 | Maa | 380/20 |
| 5,826,032 A | 10/1998 | Finn et al. | 395/200.66 |
| 5,854,750 A | 12/1998 | Phillips et al. | 364/478.04 |
| 5,870,549 A | 2/1999 | Bobo, II | 395/200.36 |
| 5,870,622 A | 2/1999 | Gulick et al. | 395/800.35 |
| 5,872,919 A | 2/1999 | Wakeland | 395/200.6 |
| 5,877,764 A | 3/1999 | Feitelson et al. | 345/347 |
| 5,894,557 A | 4/1999 | Bade et al. | 395/200.58 |
| 5,909,546 A | 6/1999 | Osborne | 395/200.42 |
| 5,918,051 A | 6/1999 | Savitzky et al. | 395/683 |
| 5,920,732 A | 7/1999 | Riddle | 395/876 |
| 5,923,892 A | 7/1999 | Levy | 395/800.31 |
| 5,935,268 A | 8/1999 | Weaver | 714/758 |
| 5,937,169 A | 8/1999 | Connery et al. | 395/200.8 |
| 5,941,988 A | 8/1999 | Bhagwat et al. | 713/201 |
| 5,943,481 A | 8/1999 | Wakeland | 395/200.6 |
| 5,946,487 A | 8/1999 | Dangelo | 395/705 |
| 5,966,534 A | 10/1999 | Cooke et al. | 395/705 |
| 5,968,161 A | 10/1999 | Southgate | 712/37 |
| 5,974,518 A | 10/1999 | Nogradi | 711/173 |
| 5,991,299 A | 11/1999 | Radogna et al. | 370/392 |
| 5,999,974 A | 12/1999 | Ratcliff et al. | 709/224 |
| 6,014,699 A | 1/2000 | Ratcliff et al. | 709/224 |
| 6,034,963 A | 3/2000 | Minami et al. | 370/401 |
| 6,046,980 A | 4/2000 | Packer | 370/230 |
| 6,049,857 A | 4/2000 | Watkins | 711/207 |
| 6,061,368 A | 5/2000 | Hitzelberger | 370/537 |
| 6,061,742 A | 5/2000 | Stewart et al. | 709/250 |
| 6,076,115 A | 6/2000 | Sambamurthy et al. | 709/250 |
| 6,078,736 A | 6/2000 | Guccione | 395/500.17 |
| 6,081,846 A | 6/2000 | Hyder et al. | 709/250 |
| 6,092,110 A | 7/2000 | Maria et al. | 709/225 |
| 6,092,229 A | 7/2000 | Boyle et al. | 714/748 |
| 6,098,188 A | 8/2000 | Kalmanek, Jr. et al. | 714/746 |
| 6,101,543 A | 8/2000 | Alden et al. | 709/229 |
| 6,122,670 A | 9/2000 | Bennett et al. | 709/236 |
| 6,151,625 A | 11/2000 | Swales et al. | 709/218 |
| 6,157,955 A | 12/2000 | Narad et al. | 709/228 |
| 6,172,980 B1 | 1/2001 | Flanders et al. | 370/401 |
| 6,172,990 B1 | 1/2001 | Deb et al. | 370/474 |
| 6,173,333 B1 | 1/2001 | Jolitz et al. | 709/240 |
| 6,182,228 B1 | 1/2001 | Boden | 713/201 |
| 6,185,619 B1 | 2/2001 | Joffe et al. | 709/229 |
| 6,208,651 B1 | 3/2001 | Van Renesse et al. | 370/392 |
| 6,226,680 B1 | 5/2001 | Boucher | 709/230 |
| 6,230,193 B1 | 5/2001 | Arunkumar et al. | 709/218 |
| 6,233,626 B1 | 5/2001 | Swales et al. | 710/11 |
| 6,247,060 B1 | 6/2001 | Boucher | 709/238 |
| 6,247,068 B1 | 6/2001 | Kyle | 709/328 |
| 6,327,625 B1 | 12/2001 | Wang et al. | 709/235 |
| 6,330,659 B1 | 12/2001 | Poff et al. | 712/34 |
| 6,334,153 B2 | 12/2001 | Boucher | 709/230 |
| 6,341,129 B1 | 1/2002 | Schroeder et al. | 370/354 |
| 6,345,301 B1 | 2/2002 | Burns et al. | 709/230 |
| 6,347,347 B1 | 2/2002 | Brown et al. | 710/23 |
| 6,389,479 B1 | 5/2002 | Boucher | 709/243 |
| 6,389,537 B1 | 5/2002 | Davis et al. | 713/187 |
| 6,393,487 B2 | 5/2002 | Boucher | 709/238 |
| 6,397,316 B2 | 5/2002 | Fesas, Jr. | 711/200 |
| 6,427,169 B1 | 7/2002 | Elzur | 709/224 |
| 6,427,171 B1* | 7/2002 | Craft et al. | 709/230 |
| 6,427,173 B1 | 7/2002 | Boucher | 709/238 |
| 6,430,628 B1 | 8/2002 | Connor | 710/5 |
| 6,434,620 B1 | 8/2002 | Boucher et al. | 709/230 |
| 6,460,080 B1 | 10/2002 | Shah et al. | 709/224 |
| 6,470,415 B1 | 10/2002 | Starr | 711/104 |
| 6,530,061 B1 | 3/2003 | Labatte | 714/807 |
| 6,591,302 B2 | 7/2003 | Boucher | 709/230 |
| 6,609,225 B1 | 8/2003 | Ng | 714/781 |
| 6,629,141 B2 | 9/2003 | Elzur et al. | 709/224 |
| 6,658,480 B2 | 12/2003 | Boucher | 709/239 |
| 6,687,758 B2 | 2/2004 | Craft | 709/250 |
| 6,697,868 B2* | 2/2004 | Craft et al. | 709/230 |
| 6,735,647 B2 | 5/2004 | Boyd et al. | 710/52 |
| 6,738,874 B2 | 5/2004 | Zsohar | 711/157 |
| 6,751,665 B2 | 6/2004 | Philbrick et al. | 709/224 |
| 6,757,746 B2 | 6/2004 | Boucher | 709/250 |
| 6,807,581 B1 | 10/2004 | Starr | 709/250 |
| 6,845,403 B2* | 1/2005 | Chadalapaka | 710/5 |
| 6,918,019 B2 | 7/2005 | Zsohar | 711/158 |
| 6,938,092 B2 | 8/2005 | Burns | 709/230 |
| 6,941,386 B2* | 9/2005 | Craft et al. | 709/250 |
| 6,965,941 B2 | 11/2005 | Boucher | 709/230 |
| 6,996,070 B2 | 2/2006 | Starr et al. | 370/252 |
| 7,042,898 B2 | 5/2006 | Blightman | 370/463 |
| 2001/0021949 A1 | 9/2001 | Blightman | 709/219 |
| 2001/0023460 A1 | 9/2001 | Boucher | 709/250 |
| 2001/0027496 A1 | 10/2001 | Boucher | 709/250 |
| 2001/0036196 A1 | 11/2001 | Blightman | 370/465 |
| 2001/0037397 A1 | 11/2001 | Boucher | 709/230 |
| 2001/0037406 A1* | 11/2001 | Philbrick et al. | 709/250 |
| 2001/0047433 A1 | 11/2001 | Boucher | 709/250 |
| 2002/0055993 A1 | 5/2002 | Shah et al. | 709/223 |
| 2002/0085562 A1 | 7/2002 | Hufferd et al. | 370/392 |
| 2002/0087732 A1 | 7/2002 | Boucher | 709/250 |
| 2002/0091844 A1 | 7/2002 | Craft | 709/230 |
| 2002/0095519 A1 | 7/2002 | Philbrick | 709/250 |
| 2002/0105972 A1 | 8/2002 | Richter et al. | 370/474 |
| 2002/0107903 A1 | 8/2002 | Richter et al. | 709/201 |
| 2002/0120899 A1 | 8/2002 | Gahan et al. | 714/748 |
| 2002/0147839 A1 | 10/2002 | Boucher | 709/238 |
| 2002/0156927 A1 | 10/2002 | Boucher | 709/250 |
| 2002/0161919 A1 | 10/2002 | Boucher | 709/238 |
| 2002/0163888 A1 | 11/2002 | Grinfeld | 370/235 |
| 2003/0005142 A1 | 1/2003 | Elzur et al. | 709/232 |
| 2003/0005143 A1 | 1/2003 | Elzur et al. | 709/232 |
| 2003/0014544 A1 | 1/2003 | Pettey | 709/249 |

| | | | | | | |
|---|---|---|---|---|---|---|
| 2003/0016669 A1 | 1/2003 | Pfister et al. ............... 370/392 | CA | 2287413AA | 11/1998 | |
| 2003/0031172 A1 | 2/2003 | Grinfeld ..................... 370/389 | CA | 2328829AA | 12/1999 | |
| 2003/0046330 A1 | 3/2003 | Hayes ....................... 709/201 | CA | 2265692 C | 8/2001 | |
| 2003/0046418 A1 | 3/2003 | Raval et al. ................ 709/237 | CN | 1237295 A | 12/1999 | |
| 2003/0056009 A1 | 3/2003 | Mizrachi et al. ............ 709/245 | CN | 1266512 T | 9/2000 | |
| 2003/0058870 A1 | 3/2003 | Mizrachi et al. ........ 370/395.52 | CN | 1305681 T | 7/2001 | |
| 2003/0061505 A1 | 3/2003 | Sperry et al. ............... 713/200 | EP | 1460805 | 9/2004 | |
| 2003/0066011 A1 | 4/2003 | Oren .......................... 714/758 | EP | 1460818 | 9/2004 | |
| 2003/0079033 A1 | 4/2003 | Craft ......................... 709/230 | TW | 447205 B | 7/2001 | |
| 2003/0084185 A1 | 5/2003 | Pinkerton ................... 709/236 | TW | 448407 B | 8/2001 | |
| 2003/0095567 A1 | 5/2003 | Lo et al. ..................... 370/466 | WO | WO 98/21655 | 5/1998 | |
| 2003/0099254 A1 | 5/2003 | Richter et al. .............. 370/466 | WO | WO 98/50852 | 11/1998 | |
| 2003/0115350 A1 | 6/2003 | Uzrad-Nali et al. ........ 709/231 | WO | WO 99/65219 | 12/1999 | |
| 2003/0115417 A1 | 6/2003 | Corrigan ..................... 711/118 | WO | WO 01/13583 | 2/2001 | |
| 2003/0128704 A1 | 7/2003 | Mizrachi et al. ............ 370/394 | WO | WO 01/28179 | 4/2001 | |
| 2003/0140124 A1 | 7/2003 | Burns ......................... 709/220 | WO | WO 02/39302 | 5/2002 | |
| 2003/0145101 A1 | 7/2003 | Mitchell et al. ............ 709/236 | WO | WO 02/059757 | 8/2002 | |
| 2003/0145270 A1 | 7/2003 | Holt ........................... 714/766 | WO | WO 02/086674 | 10/2002 | |
| 2003/0167346 A1 | 9/2003 | Craft ......................... 709/250 | WO | WO 03/021443 | 3/2003 | |
| 2003/0200284 A1 | 10/2003 | Philbrick .................... 709/219 | WO | WO 03/021447 | 3/2003 | |
| 2004/0003126 A1 | 1/2004 | Boucher ...................... 709/250 | WO | WO 03/021452 | 3/2003 | |
| 2004/0030757 A1 | 2/2004 | Pandya ....................... 709/217 | WO | WO 03/079612 | 9/2003 | |
| 2004/0030770 A1 | 2/2004 | Pandya ....................... 709/223 | WO | WO 2005/057880 | 6/2005 | |
| 2004/0030806 A1* | 2/2004 | Pandya ....................... 709/250 | | | | |
| 2004/0037299 A1* | 2/2004 | Pandya ....................... 370/401 | | OTHER PUBLICATIONS | | |
| 2004/0037319 A1 | 2/2004 | Pandya ....................... 370/469 | | | | |
| 2004/0054613 A1 | 3/2004 | Boucher ...................... 709/250 | | | | |
| 2004/0062245 A1 | 4/2004 | Sharp et al. ................ 370/392 | | | | |
| 2004/0062246 A1 | 4/2004 | Boucher ...................... 370/392 | | | | |
| 2004/0064578 A1 | 4/2004 | Boucher ...................... 709/250 | | | | |
| 2004/0064589 A1 | 4/2004 | Boucher ...................... 709/250 | | | | |
| 2004/0064590 A1 | 4/2004 | Starr ........................... 709/250 | | | | |
| 2004/0073703 A1 | 4/2004 | Boucher ...................... 709/245 | | | | |
| 2004/0078462 A1 | 4/2004 | Philbrick .................... 709/224 | | | | |
| 2004/0088262 A1 | 5/2004 | Boucher ....................... 705/65 | | | | |
| 2004/0093411 A1 | 5/2004 | Elzur et al. ................. 709/224 | | | | |
| 2004/0100952 A1 | 5/2004 | Boucher ...................... 370/389 | | | | |
| 2004/0111535 A1 | 6/2004 | Boucher ...................... 709/250 | | | | |
| 2004/0117509 A1 | 6/2004 | Craft ......................... 709/250 | | | | |
| 2004/0148377 A1 | 7/2004 | Zsohar ....................... 709/223 | | | | |
| 2004/0158640 A1 | 8/2004 | Philbrick .................... 709/230 | | | | |
| 2004/0158793 A1 | 8/2004 | Blightman .................. 714/758 | | | | |
| 2004/0165588 A1 | 8/2004 | Pandya ....................... 370/389 | | | | |
| 2004/0210320 A1 | 10/2004 | Pandya ........................... 700/1 | | | | |
| 2004/0240435 A1 | 12/2004 | Boucher ...................... 370/352 | | | | |
| 2005/0066046 A1 | 3/2005 | Chadalapaka ............... 709/230 | | | | |
| 2005/0071131 A1 | 3/2005 | Anderson et al. ........... 702/189 | | | | |
| 2005/0108492 A1 | 5/2005 | Zsohar ....................... 711/167 | | | | |
| 2005/0120141 A1 | 6/2005 | Zur et al. .................... 709/249 | | | | |
| 2005/0122986 A1 | 6/2005 | Starr et al. .................. 370/412 | | | | |
| 2005/0131986 A1 | 6/2005 | Haagens et al. ............ 709/201 | | | | |
| 2005/0141561 A1 | 6/2005 | Craft ......................... 370/474 | | | | |
| 2005/0160139 A1 | 7/2005 | Boucher ...................... 709/203 | | | | |
| 2005/0165985 A1 | 7/2005 | Vangal et al. ............... 710/107 | | | | |
| 2005/0175003 A1 | 8/2005 | Craft ......................... 370/389 | | | | |
| 2005/0182841 A1 | 8/2005 | Sharp ......................... 709/228 | | | | |
| 2005/0187939 A1 | 8/2005 | Krithivas ..................... 707/10 | | | | |
| 2005/0198198 A1 | 9/2005 | Craft ......................... 709/217 | | | | |
| 2005/0204058 A1 | 9/2005 | Philbrick .................... 709/238 | | | | |
| 2005/0278459 A1 | 12/2005 | Boucher ...................... 709/250 | | | | |
| 2006/0009952 A1 | 1/2006 | Anderson et al. ........... 702/194 | | | | |
| 2006/0010238 A1 | 1/2006 | Craft ......................... 709/227 | | | | |

FOREIGN PATENT DOCUMENTS

| | | |
|---|---|---|
| AU | 7364898 | 11/1998 |
| AU | 4435999 | 12/1999 |
| AU | 723724 | 9/2000 |
| AU | 0070603 | 3/2001 |
| AU | 734115 | 6/2001 |
| AU | 0741089 | 11/2001 |
| AU | 0228874 | 5/2002 |
| CA | 2265692AA | 5/1998 |

OTHER PUBLICATIONS

Muller, Raimund, LON-das universelle Notzwerk Elektronik 22-1991.

Abbot, Mark B.; Peterson, Larry L., "Increasing Network Trhoguhput by Integrating Protocol Layers" IEEE 1993.

Wright, Maury, Low-Cost Control LANs Add Automation to Homes, Autos, and Offices EDN-Technology Jul. 20, 1992.

Preston, David J., "Internet Protocols Migrate To Silicon For Networking Devices" Electronic Design Apr. 14, 1997.

Chesson, Greg, "The Protocol Engine Project" Technology Focus Sep. 1987.

Chesson, Greg, "Proceedings of the Summer 1987 USENIX Conference" USENIX Association Jun. 8-12, 1987.

G. Chesson and L. Green, "XTP Protocol Engine VLSI for Real-Time LANS" EFOC/LAN Jun. 29-Jul. 1, 1968.

Wayner, "Sun Gambles on Java Chops", Bytes, Nov. 1996.

Raz, "Real Time Program Language Accelerator", WO 98/21655, May 1998.

Agrawal et al. "Architecture and Design of the Mars Hardware Accelerator", ACM 1987, pp. 101-107.

Case, "Implementing the Java Virtual Machine", Microprocessor Report, Mar. 1996.

Kitadeya et al., "Matsushita Launches Web TV Internet Connection Terminal", http://www.mei.co.jp/corp/news/official.data/data.dir/cn98112-1/cn98112-1.html, Nov. 1998.

iReady Product Data Sheet, Internet Tuner.

Johnson et al., "Internet Tuner", New Media News, http://www.newmedianews.com/020197/ts.sub-inettuner.html, Jan. 1997.

Kelly, T., "Cheap Internet Hardware that Fits in Everything", ZDNet, http://www.zdnet.co.uk/news/1998/44/ns-5998.html, Nov. 1998.

8802-3:2000 ISO/IEC Information Technology, http://www.computer.org/cspress/CATALOG/st01118.htm.

INCITS: Development work conducted in t10-I/O Interface-Lower Level Sep. 30, 2002 Weber, Ralph O.

Stevens, Richard W., "TCP/IP Illustrated Volume" Addison-Wesley Professional Computing Series.

Abbot, Mark B., and Peterson, Larry L., "Increasing Network Throughput by Integrating Protocol Layers" IEEE 1993.

Wright, Maury, "Low-Cost Control LANs Add Automation to Homes, Autos, and Offices" EDN Jul. 20, 1992.

Preston, David J., "Internet Protocols Migrate to Silicon For Networking Devices" Electronic Design Apr. 14, 1997.

Muller, Raimund, "LON - das universelle Netzwerk" Electronik 22/1991.

Rang, Michael; Tantawy, Ahmed, "A Design Methodology for Protocol Processors" IEEE 1995.

Banks, David and Prudence, Michael,"A High-Performance Network Architecture for a PA-RISC Workstation" IEEE Journal vol. II, No. 22 Feb. 1993.

Steenkiste, Peter, "A High-Speed Network Interface for Distributed-Memory Systems: Architecture and Applications" ACM Transactions on Computer Systems, vol. 15, No. 1 Feb. 1997.

Doumenis, Gr.A., Konstantoulakis, G.E., Reisis, D.I.and Stassinopoulos, G.I. "A Personal Computer Hosted Terminal Adapter For The Broadband Integrated Services Digital Network and Applications" National Technical University of Athens, Greece.

Womack, Lucas; Mraz, Ronald; Mendelson, Abraham, "A Study of Virtual Memory MTU Reassembly withing the PowerPC Architecture" IEEE 1997.

Steenkiste, Peter, "A Systematic Approach to Host Interface Design for High-Speed Networks" IEEE Mar. 1994.

Wittie, Larry D., Ma, Fanyuan, "A TCP/IP Communication Subsystem in Micros" IEEE 1987.

Dalton, Chris; Watson, Greg; Banks, David; Calamvokis, Costas; Edwards, Aled; Lumley, John, "Afterburner: A Network-independent card provides architectural support for high-performance protocols" IEEE Jul. 1993.

Gupta, Pankaj; McKeown, Nick, "Algorithms for Packet Classification" IEEE Network Mar./Apr. 2001.

Clark, David D.; Romkey, John; Salwen, Howard, "An Analysis of TCP Processing Overhead" IEEE 1988.

Clark, David D.; Jacobson, Van; Romkey, John; Salwen, Howard, "An Analysis of TCP Processing Overhead" IEEE Jun. 1989.

Goloi, W. K.; Behr, P. "An IPC Protocol and ITS Hardware Realization For A High-Speed Distributed Multicomputer System" IEEE 1981.

Ames, Richard, "Building an Embedded Web Server from Scratch" Circuit Cellar INK Feb. 1998.

Legg, John, "Choosing and implementing an embedded TCP/IP Stack" Electronic Product Design Jan. 1999.

Orphanos, George; Birbas, Alexios; Petrellis, Nikos; Mountzouris, Ioannis; Malataras, Andreas, "Compensating for Moderate Effective Throughput at the Desktop" IEEE Communication Magazine Apr. 2000.

Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.

Varada, S.; Yang, Y.; Evans, D., "Data and Buffer Management in ATM Systems" TranSwitch Corporation.

Bonjour, Dominique; de Hauteclocque, Gaelle; le Moal, Jacques, "Design and Application of ATM LAN/WAN Adapters" IEEE 1998.

Kim, Chan; Jun, Jong-Jun; Park, Yeong-Ho; Lee, Kyu-Ho; Kim, Hyup-Jong, "Design and Implementation of a High-Speed ATM Host Interface Controller" Electronics and Telecommunications Research Institute, Korea.

Steenkiste, Peter, "Design, Implementation, and evaluation of a Single-copy Protocol Stack" Software—Practice and Experience, vol. 28, Jun. 1998.

Mcleis, Hanafy E.; Serpanos, Dimitrios, N., "Designing Communication Subsystems for High-Speed Networks" IEEE Network Jul. 1992.

Doumenis, Gr. A.; Reisis, D.I.; Stassinopoulos, G.I., "Efficient Implementation of the SAR Sublayer and the ATM Layer in High-Speed Broadband ISDN Data Terminal Adapters" IEEE 1993.

Mora, F.; Sebastia, A., "Electronic Design of a High Performance Interface to the SCI Network" IEEE 1998.

Eady, Fred, "Embedded Internet Part 2: TCP/IP and a 16-Bit Compiler" Embedded PC Jun. 1999.

Shivam, Piyush; Wyckoff, Pete; Panda, Dhabaleswar, "EMP: Zero-copy OS-bypass NIC-driven Gigabit Ethernet" SC2001 Nov. 2001, Denver CO, USA.

Mansour, Mohammad; Kayssi, Ayman, "FPGA-Based Internet Protocol Version 6 Router" IEEE 1998.

Smith, Jonathon M.; Traw, C. Brendan S., "Giving Applications Access to Gb/s Networking" IEEE Network Jul. 1993.

Traw, C. Brendan S.; Smith, Jonathan M., "Hardware/Software Organization of a High-Performance ATM Host Interface" IEEE 1993.

Nagata, Takahiko; Hosoda, Yamashita, Hiroyuki, "High-Performance TCP/IP/ATM Communication Board" NTT Information and Communication Systems Laboratories 1998.

Nagata, Takahiko; Hosoda, Yasuhiro; Yamahsita, Hiroyuki, "High-Performance TCP/IP/ATM Communication Boards: Driving Force for Various Multimedia Services" vol. 9 No. 6 Nov. 1997.

Jolitz, William Frederick, "High-Speed Networking: Header prediction and forward-error correction for very high-speed data transfer" Dr. Dobbs Journal, Aug. 1992.

Chiswell, Dave "Implementation Challenges for 155Mbit ATM Adapters" ISBN#0-7803-2636-9.

Wright, Maury "Intelligent Ethernet Boards" EDN Jun. 23, 1988.

Preston, David "Internet Protocols Migrate to Silicon For Networking Devices" Electronic Design Apr. 14, 1997.

Ivanov-Loshkanov, V.S.; Sevast'yanov, S.F., Semenov, M.N., "Network Microprocessor Adapter" Avtmatika i Vyshislitel'naya Tekhnika vol. 17 No. 5 pp. 25-28, 1983.

Druschel, Peter; Abbot, Mark B.; Pagels, Michael A.; Peterson, Larry L., "Network Subsystem Design" IEEE Network Jul. 1993.

Huange, Jau-Hsiung; Chen, Chi-Wen, "On Performance Measurements of TCP/IP and its Device Driver" IEEE 1992.

Siegel, Martin; Williams, Mark; Robler, Georg, "Overcoming Bottlenecks in High-Speed Transport Systems" IEEE 1991.

Neufeld, Gerald W.; Ito, Mabo Robert; Goldberg, Murray; McCutcheon, Mark J.; Ritchie, Stuart, "Paralleel Host Interface for an ATM Network" IEEE Network Jul. 1993.

Maly, K.; Khanna, K.; Kukkamala, R.; Overstreet C.M.; Yerraballi, R.; Foundriat, E.C.; Madan, B.; "Parallel TCP/IP For Multiprocessor Workstations" High Performance Networking, IV, 1993 IFIP.

Laskman, T.V.; Madhow, U., "Performance Analysis of Window-based Flow Control using TCP/IP: Effect of High Bandwidth Delay Products and Random Loss" High Performance Networking V. 1994 IFIP.

Ramakrishnan, K. K., "Performance Considerations in Designing Network Interfaces" IEEE Journal 1993.

Camarda, P.; Pipio, F.; Piscitelli, G.; "Performance evaluating of TCP/IP implementations in end systems" IEE Proc-Computer Digital Tech. vol. 146 No. 1 Jan. 1999.

Toyoshima, Kan; Shirakawa, Kazuhiro; Hayashi, Kazuhiro, "Programmable ATM Adapter: Rapid Prototyping of Cell Processing Equipment for ATM Network" IEEE 1997.

Blumrich, Matthias A.; Dubnicku, Cezary; Felton, Edward W.; Li, Kai, "Protected, User-level DMA for the SHRIMP Network Interface" IEEE 1996.

Feldmeier, David C.; McAuley, Anthony J.; Smith, Jonathan M., Bakin, Deborah S.; Marcus, William S.; Raleigh, Thomas M., "Protocol Boosters" IEEE 1998.

Marcus, William S.; Hadzic, Ilija; McAuley, Anthony J.; Smith, Jonathan M., "Protocol Boosters: Applying Programmability to Network Infrastructures" IEEE Communications Magazine Oct. 1998.

Korablum, Deborah F., "Protocol Implementation and Other Performance Issues for Local and Metropolitan Area Networks" EEE 1988.

Dittia, Zubin D.; Parulkar, Guru M.; Jr., Jerome R. Cox, "The APIC Approach to High Performance Network Interface Design: Protect4ed DMA and Other Techniques" IEEE 1997.

Rutsche, Erich, "The Architecture of a Gb/s Multimedia Protocol Adapter" ACM SIGCOMM Computer Communication Review.

Moldeklev, Kjersti; Klovning, Espen; Kure, Oivind, "The effect of end system hardware and software on TCP/IP throughput performance over a local ATM Network".

Kanakia, Hermant; Cheriton, David R., "The VMP Network Adapter Board (NAB) High Performance Network Communication for Multiprocessors" ACM 1988.

Chandrammenon, Grish P.; Varghese, George, "Trading Packet Headers for Packet Processing" IEEE 1996.

Niclson, Dr. Michael J.K., "TURBOchannel" IEEE 1991.

New Media News, www.newmedianews.com/02197/ts incttuner.html.

Kelly, T. "Cheap Internet Hardware that Fits in Everything" ZDNet, www.zdnet.co.uk/news/1998/77/us-5998.html.

Kitadeya et al. "Matsushita Launches WebTV Internet Connection Terminal" www.mci.co.ip/corp/news/official.data.dir/en981112-1/en981112-1htm.
eady Product Data Sheet, Internet Tuner.
Luijten, Ronald P., "An OC-12 ATM Switch Adapter Chipset" 1998 IEEE.

"Less-Numerical Algorithms", Ch. 20 p. 888-895.
"Storage Networking Industry Association" iSCSI Building Blocks for IP Storage Networking, www.ipstorage.org.

* cited by examiner

SYSTEM AND METHOD FOR RECEIVING ISCSI PROTOCOL DATA UNITS

FIELD OF THE INVENTION

The present invention relates to network storage, and more particularly to receiving Internet small computer system interface (iSCSI) data for storage purposes.

BACKGROUND OF THE INVENTION

The Internet small computer system interface (iSCSI) protocol is an Internet protocol (IP)-based storage networking standard for linking data storage facilities, developed by the Internet Engineering Task Force (IETF). By carrying SCSI commands over IP networks, iSCSI is used to facilitate data transfers over intranets and to manage storage over long distances.

The iSCSI protocol is among the key technologies expected to help bring about rapid development of the storage area network (SAN) market, by increasing the capabilities and performance of storage data transmission. Because of the ubiquity of IP networks, iSCSI can be used to transmit data over local area networks (LANs), wide area networks (WANs), or the Internet and can enable location-independent data storage and retrieval.

Figure 1:
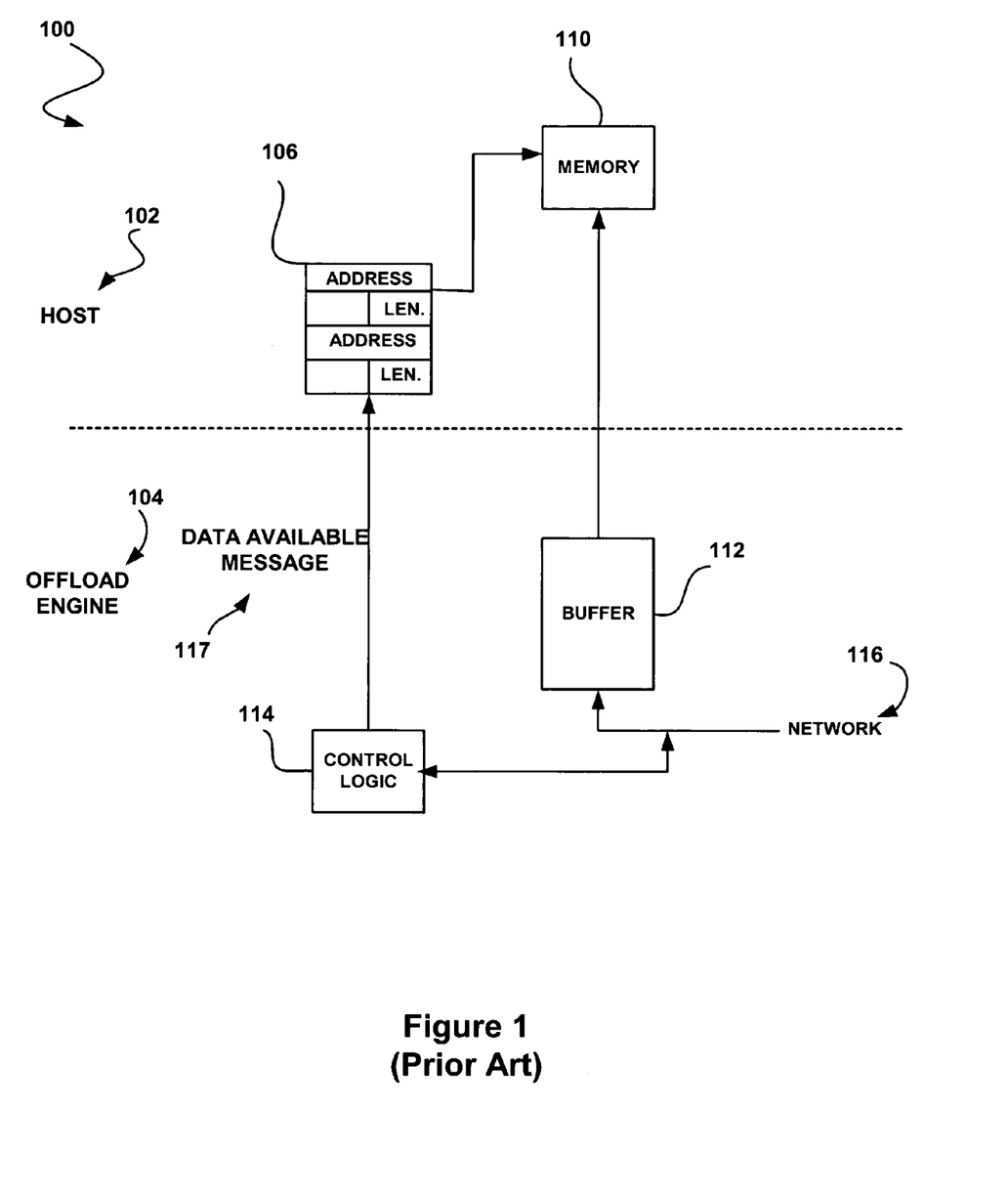
FIG. 1 illustrates a system including both a host processor and a transport offload engine, in accordance with the prior art.

Prior art FIG. 1 illustrates a network system 100 including both a host processor 102 and a transport offload engine 104 (i.e. TOE), in accordance with the prior art. As an option, such system 100 may be implemented in the context of the iSCSI protocol. Of course, however, such system 100 may be carried out in any desired protocol context.

In use, once communication across the network 116 is established using a connection or socket, the transport offload engine 104 receives packet data [i.e. iSCSI protocol data units (PDUs), etc.]. Once received, the transport offload engine 104 stores the data contained in the PDUs in a TOE buffer 112, in order to provide time to generate a data available message 117 and send the message to the host processor 102. The foregoing operation of the transport offload engine 104 may be governed by control logic 114 of the transport offload engine 104.

In response to a data available message 117, the host processor 102 generates a data list 106 [i.e. a scatter-gather list (SGL), memory descriptor list (MDL), etc.] that describes the location(s) in application memory 110 where the incoming data is ultimately to be stored. As shown, to accomplish this, the data list 106 may include at least one memory start address where the incoming data in each PDU is to be stored, with each start address followed by the length of a region in the application memory 110.

In use, the host processor 102 generates and associates the data list 106 with a socket (also known as a connection) associated with the received PDUs that prompted the corresponding data available message(s) 117. The incoming data contained in the PDUs is then copied from the TOE buffer 112 to the application memory 110 using the locations described by the data list 106 corresponding to that socket.

Thus, to receive a large number of PDUs via the network 116, the required size of the TOE buffer 112 may become excessively large. Unfortunately, a large TOE buffer 112 can not be implemented in a cost-effective manner on an integrated-circuit transport offload engine 104, since integrating on-board memory on the transport offload engine 104 is costly in terms of silicon die area, for example.

Therefore, there is a general desire to minimize, or even altogether eliminate, memory (i.e. see, for example, TOE buffer 112, etc.) on the transport offload engine 104 for providing a cost effective transport offload engine 104.

There is thus a need for a cost effective technique of managing received PDUs using data lists (i.e. SGLs, MDLs, etc.) in the context of a transport offload engine.

SUMMARY OF THE INVENTION

An Internet small computer system interface (iSCSI) system, method and associated data structure are provided for receiving data in protocol data units. After a protocol data unit is received, a data list is identified that describes how the data contained in the protocol data unit is to be stored (i.e. placed, saved, etc.) in memory (i.e. application memory). Further stored is a state of the data list. To this end, the state of the data list is used in conjunction with the storage of data from a subsequent protocol data unit.

In one embodiment, the data list may include a scatter-gather list (SGL), a memory-descriptor list (MDL), etc. The use of an SGL or MDL is a technique to describe a non-contiguous region of memory using an ordered list of address and length pairs. As a further option, the state of the data list may be stored using a transport offload engine (TOE).

The protocol data unit may include one or more header portions and one or more data portions. Still yet, information may be extracted from the header portion(s) of the protocol data unit. Thus, the data list may be identified based on such information. Optionally, the information may include a tag. The relevant header information is then stored in a Control Block (CB) associated with a socket associated with the protocol data unit. For protocol data units that are received that contain no header portion(s), the stored tag is retrieved from the CB and used to identify the data list to be used to store the incoming data contained in the received protocol data unit. If no information is extracted from the header portion(s) of the protocol data unit, or if the information extracted identifies an invalid data list, at least the data contained in a segment (i.e. fraction) of the protocol data unit (i.e. that part that does not contain a header) may be stored in a host buffer.

In still another embodiment, data in segments of the protocol data unit may be stored using the data list until an end of the data list is detected. If the end of the data list is detected prior to all of the data in the segments of the protocol data unit being stored, the data list may be retired (that is, invalidated or discarded, etc.). Further, the data in the protocol data units that are received which would have used the aforementioned retired data list may be stored in the aforementioned host buffer.

Still yet, the state and/or contents of the data list may be updated after each use of the data list so that subsequent protocol data units that arrive may use the same aforementioned data list.

In use, the state of the data list may indicate a location (i.e. an index, etc.) in the data list, so that the data in a segment of a subsequent protocol data unit may be stored using the same data list. In other words, the data list may be re-used the next time particular information (i.e. the tag) is detected in association with a subsequent protocol data unit. Thus, multiple related protocol data units that share a tag may use the same data list. By this sharing method, various resources may thus optionally be saved such as transport offload engine memory and processor cycles. Moreover, latency may optionally be reduced by this method.

BRIEF DESCRIPTION OF THE DRAWINGS

Prior art

DETAILED DESCRIPTION

Figure 2:
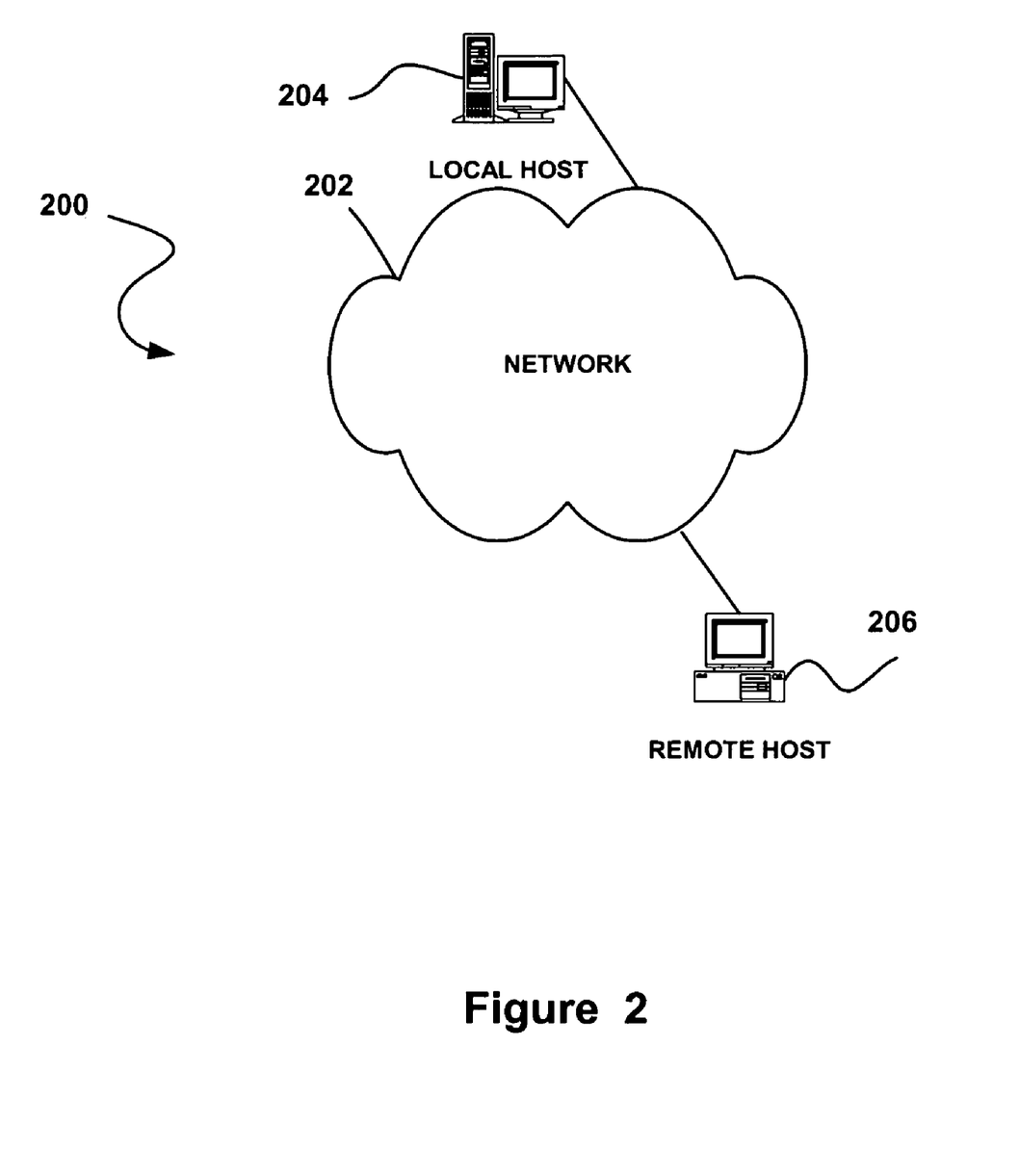
FIG. 2 illustrates a network system, in accordance with one embodiment.

FIG. 2 illustrates a network system 200, in accordance with one embodiment. As shown, a network 202 is provided. In the context of the present network system 200, the network 202 may take any form including, but not limited to a local area network (LAN), a wide area network (WAN) such as the Internet, etc.

Coupled to the network 202 are a local host 204 and a remote host 206 which are capable of communicating over the network 202. In the context of the present description, such hosts 204, 206 may include a web server, storage device or server, desktop computer, lap-top computer, hand-held computer, printer or any other type of hardware/software. It should be noted that each of the foregoing components as well as any other unillustrated devices may be interconnected by way of one or more networks.

Figure 3:
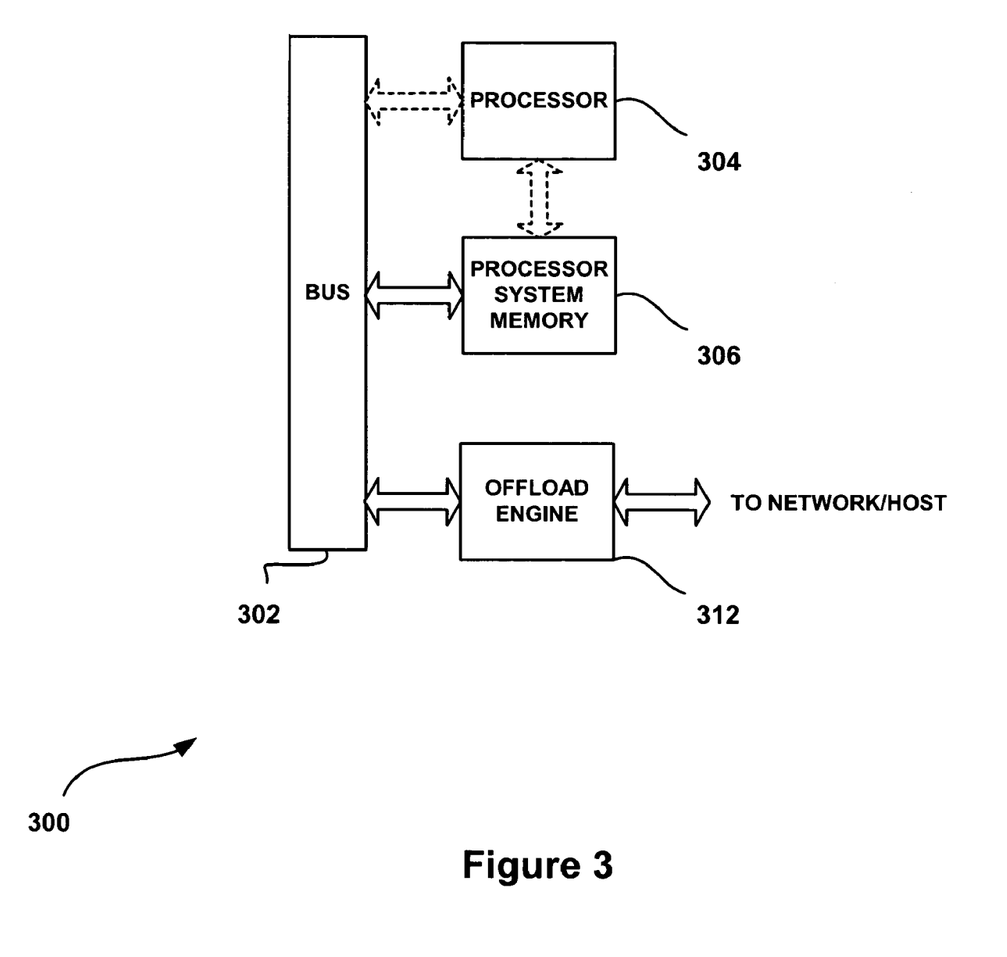
FIG. 3 illustrates an exemplary architecture in which one embodiment may be implemented.

FIG. 3 illustrates an exemplary architecture 300 in which one embodiment may be implemented. In one embodiment, the architecture 300 may represent one of the hosts 204, 206 of FIG. 2. Of course, however, it should be noted that the architecture 300 may be implemented in any desired context.

For example, the architecture 300 may be implemented in the context of a general computer system, a circuit board system, a game console system dedicated for entertainment purposes, a set-top box, a router, a network system, a storage system, an application-specific system, or any other desired system associated with the network 202.

As shown, the architecture 300 includes a plurality of components coupled via a bus 302. Included is at least one processor 304 for processing data. While the processor 304 may take any form, it may, in one embodiment, take the form of a central processing unit (CPU), a host processor, a chipset (i.e. a group of integrated circuits designed to work and sold as a unit for performing related functions, etc.), or any other desired processing device(s) capable of processing data.

Further included is processor system memory 306 which resides in communication with the processor 304 for storing the data. Such processor system memory 306 may take the form of on-board or off-board random access memory (RAM), a hard disk drive, a removable storage drive (i.e., a floppy disk drive, a magnetic tape drive, a compact disk drive, etc.), and/or any other type of desired memory capable of storing data.

In use, programs, or control logic algorithms, may optionally be stored in the processor system memory 306. Such programs, when executed, enable the architecture 300 to perform various functions. Of course, the architecture 300 may simply be hardwired.

Further shown is a transport offload engine 312 in communication with the processor 304 and the network (see, for example, network 202 of FIG. 2). In one embodiment, the transport offload engine 312 may remain in communication with the processor 304 via the bus 302. Of course, however, the transport offload engine 312 may remain in communication with the processor 304 via any mechanism that provides communication therebetween. The transport offload engine 312 may include a transport (i.e. TCP/IP, iSCSI, remote direct memory access (RDMA), etc.) offload engine (TOE), system, or any integrated circuit(s) that is capable of managing the data packets transmitted across the network.

While a single bus 302 is shown to provide communication among the foregoing components, it should be understood that any number of bus(es) (or other communicating mechanisms) may be used to provide communication among the components. Just by way of example, an additional bus may be used to provide communication between the processor 304 and processor system memory 306.

During operation, once communication across the network 116 is established using a connection or socket, the transport offload engine 312 and/or processor 304 receives packets containing protocol data units (PDUs), and uses a data list that describes how the data contained in the protocol data units is to be stored (i.e. placed, saved, etc.) in application memory (see, for example, processor system memory 306). In one embodiment, each packet may include one or more complete protocol data units, and/or a segment thereof (that is, a protocol data unit may be divided into packets or segments of various lengths). Moreover, each protocol data unit may include one or more header portion(s) and one or more data portion(s), both of various lengths. In the context of the present description, however, a protocol data unit may refer to any unit or type of packet using any suitable protocol.

After a protocol data unit is received, information is extracted from the header portion(s) of the protocol data unit that identifies a data list that is used to store the received data in the application memory. If no header portion was received in the protocol data unit, then the information used to identify the appropriate data list is retrieved from a socket control block (CB). The socket control block stores information for each established socket or connection. Further, the state of the data list is stored back in the data list itself after the protocol data unit received has been stored in application memory. While, in one embodiment, this state storage may be carried out using a transport offload engine (see, for example, transport offload engine 312), such state storage may be carried out by any components (i.e. the processor 304, etc.).

To this end, the state of the data list is used in conjunction with the storage of a subsequent protocol data unit, thus improving network communication speed and performance. Specifically, in one embodiment, the data list may be re-used the next time particular information (i.e. a tag, such as an iSCSI initiator transfer tag (ITT), a target transfer tag (TTT), an RDMA steering tag, etc.) is detected in association with a subsequent protocol data unit. Thus, multiple related protocol data units that share a tag may use a single data list. By using this sharing method, various resources may thus optionally be saved such as transport offload engine memory and processor cycles. Moreover, latency (the time required to process a protocol data unit) may optionally be reduced by this method.

More information will now be set forth regarding one exemplary data list structure, method and system by which the data list state is stored and used in the foregoing manner.

Figure 4:
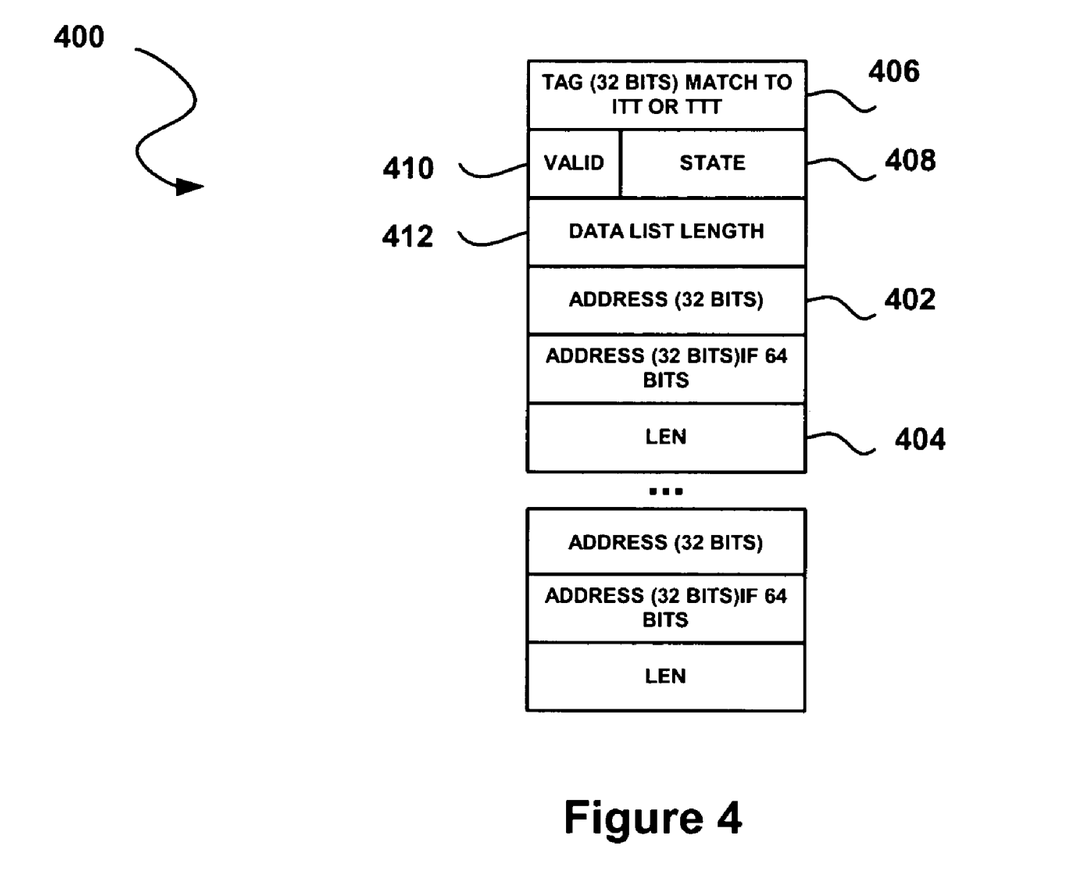
FIG. 4 illustrates an exemplary data structure associated with a data list, in accordance with one embodiment.

FIG. 4 illustrates an exemplary data list structure associated with a data list 400, in accordance with one embodiment. As an option, the data list 400 may be used in the context of the exemplary architecture 300 of FIG. 3. Of course, however, it should be noted that the data list 400 may be implemented in any desired context.

In one embodiment, the data list 400 may include a scatter-gather list (SGL), a memory-descriptor list (MDL), or any other data structure capable of describing how data contained in protocol data units is stored in application memory.

As shown, the data list 400 includes an object with at least one address 402 (of any desired size, e.g. 32 bits or 64 bits, etc.) that identifies the start location or locations in application memory to store the data communicated across the network. Still yet, the data list 400 may include, for each address 402, a length 404 that identifies a region in the application memory. Of course, the data list 400 may include any information that describes how the data contained in protocol data units communicated across the network is to be stored in application memory.

As further shown, the data list 400 may include additional information. In one embodiment, such additional information may take the form of a data list header. Further, the additional information may include a tag 406 (of any desired size, i.e. 32 bits, etc.). In such embodiment, the tag 406 may be kept together with the data list 400.

As will soon become apparent, the tag 406 may be used to determine whether the incoming data in a protocol data unit is to be temporarily stored in a buffer, or to be stored directly in application memory. As an option, the buffer may include a host buffer (i.e. temporary buffer, holding buffer, eddy buffer, anonymous buffer, any buffer associated with a host, etc.). Still yet, the host buffer and the application memory may separately reside in the same memory (see, for example, processor system memory 306 of FIG. 3).

Of course, the aforementioned buffer may be separate from the application memory, in any desired manner. For example, the buffer may reside on the transport offload engine as a TOE buffer. In the context of the present description, "separate" may refer to physically and/or logically separated, and/or situated in the same and/or different physical memories. With this in mind, the buffer will henceforth be referred to as a host buffer or anonymous buffer for simplicity.

To accomplish this, such tag 406 may have portions allocated for being matched to tags of received protocol data units. More information regarding such matching operation will be set forth in greater detail during reference to subsequent figures.

Still yet, a valid field 410 may be included in the data list 400 to indicate whether the data list 400 is valid. To accomplish this, the valid field 410 may include an application memory location. The manner in which such application memory location is used to verify whether the data list is valid will also be set forth hereinafter in greater detail during reference to subsequent figures.

Still yet, a data list length field 412 may be included in the data list 400 to indicate the total space in application memory provided by the data list. This total space information may be used to quickly determine if the incoming data in a protocol data unit is to be stored in application memory using the data list, or whether the data is to be stored in anonymous buffers instead.

Moreover, the data list state 408 may be included in the data list 400 for tracking a state of the data list 400. In one embodiment, the data list state 408 may include an index pointing to a location in the data list 400. As will soon become apparent, such index may be used for identifying the location where incoming data contained in protocol data units is to be stored. While an index is provided herein as an example of a state, it should be noted that the data list state 408 may include any aspect associated with the state of the data list 400.

More information will now be set forth regarding one exemplary method by which the transport offload engine may store and use the data list state as well as the other information associated with the data list 400.

Figure 5:
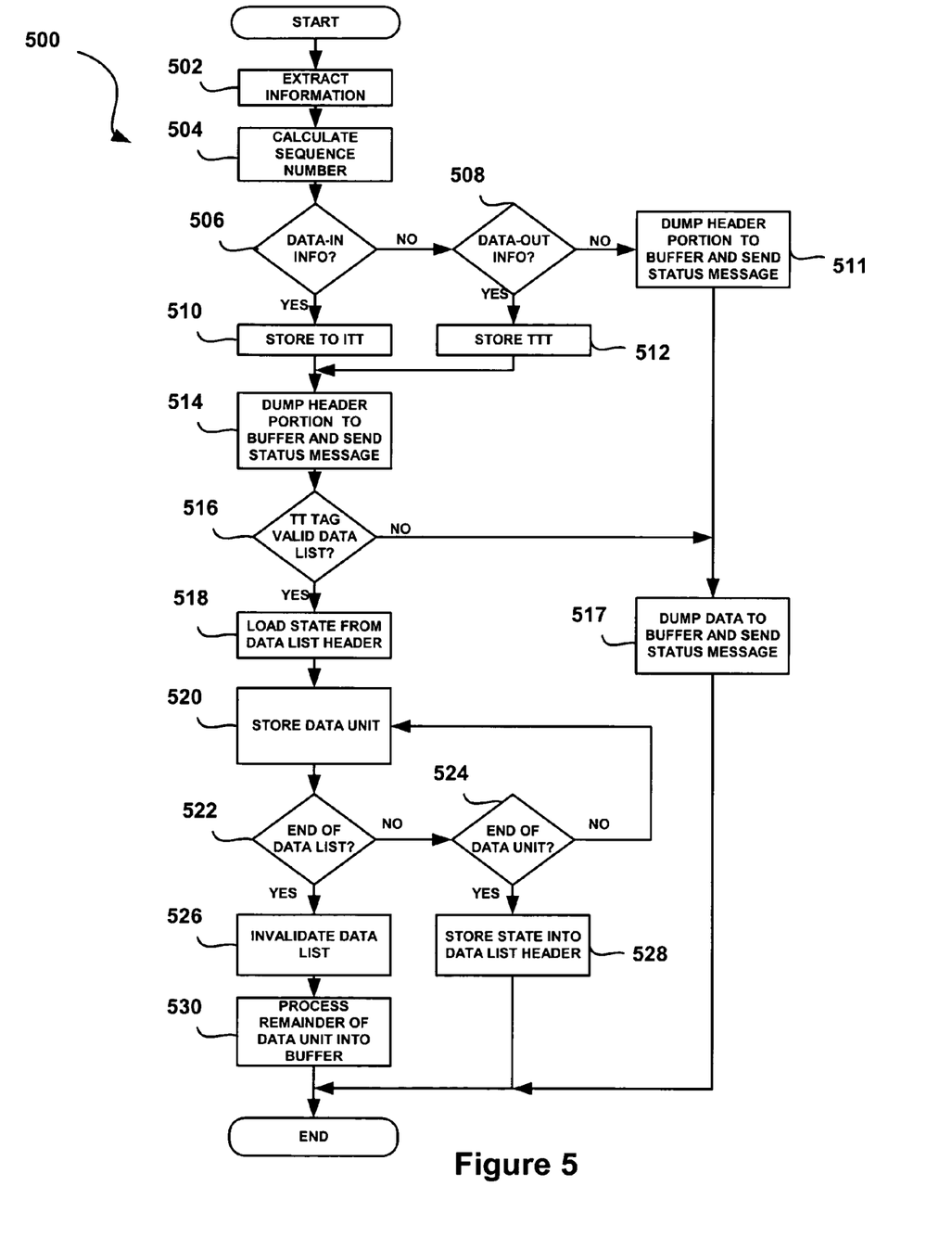
FIG. 5 illustrates an exemplary method for managing incoming protocol data units communicated via a network, in accordance with one embodiment.

FIG. 5 illustrates an exemplary method 500 for managing incoming protocol data units communicated via a network, in accordance with one embodiment. As an option, the method 500 may be carried out in the context of the exemplary architecture 300 of FIG. 3 using the data list 400 of FIG. 4. Of course, however, it should be noted that the method 500 may be implemented in any desired context. Moreover, while various functions may be attributed to exemplary components (i.e. like those set forth hereinabove), it is important to understand that the various functionality may be carried out by any desired entity.

In use, protocol data units are received using a transport offload engine (see, for example, transport offload engine 312 of FIG. 3). As shown, after a protocol data unit is received, information is extracted from the header portion of the protocol data unit. Note operation 502. As an option, such information may include a tag [i.e. iSCSI initiator transfer tag (ITT), iSCSI target transfer tag (TTT), RDMA steering tag, etc.]. In the case of ITT and TTT tags, such tags may be extracted from an Internet small computer system interface (iSCSI) protocol data unit (PDU) header.

Still yet, a sequence number is calculated. See operation 504. Such sequence number may include any number that identifies a sequence in which the protocol data unit is received. The sequence number may further be stored in the socket control block associated with the socket.

Thereafter, it is determined whether to store the incoming data in the protocol data unit using a host buffer or to store the incoming data directly in application memory using a data list (and, if so, which data list). Such determination is made based on the aforementioned information extracted in operation 502.

Specifically, it is determined what type of protocol data unit was received by examining the extracted information. Note decisions 506–508. If the received protocol data unit is of an unknown type the header portion of the protocol data unit is copied to a host buffer. See operation 511. The copying of data to a host buffer or application memory may be accomplished by using a direct memory access (DMA) transfer. Moreover, a status message is sent from the transport offload engine to a processor (see, for example, processor 304 of FIG. 3). Such status message may identify the address of the host buffer where the header portion of the protocol data unit is stored, along with, for example, the length of the portion of protocol data unit stored, and connection information associated with the protocol data unit.

Table #1 illustrates an exemplary status message format. Such format is set forth for illustrative purposes only, and should not be considered as limiting in any manner.

TABLE #1

| Ver | SB Length | SB Code | Socket CB Handle |
|---|---|---|---|
| Host Buffer Address | | | |
| | | | Data Size |

On the other hand, if the type of the received protocol data unit can be determined from the extracted information from decisions 506 or 508, an attempt may be made to store the data in the protocol data unit using a data list [i.e. a scatter-gather list (SGL), memory descriptor list (MDL), etc.]. Further, the extracted information from decisions 506 or 508 associated with the protocol data unit may be in the form of a tag.

In particular, if it is determined in decision 506 that the extracted information indicates that the received protocol data unit is of a first type of protocol data unit, the data list associated with the first type of protocol data unit is retrieved, in operation 510. Moreover, if it is determined in decision 508 that the extracted information indicates that the received protocol data unit is of a second type of protocol data unit, the data list associated with the second type of protocol data unit is retrieved, in operation 512. It should be noted that the data list is identified utilizing a tag extracted from the protocol data unit header as a direct pointer into memory of where the aforementioned data list is located.

Although the preceding description pertains to a technique for processing two different types of received protocol data unit, it should be noted that such exemplary operation is set forth for illustrative purposes only and should not be construed as limiting in any manner. For example, the instant functionality may equally apply to any number of different types of protocol data unit.

Next, in operation 514, the header portion of the protocol data unit is stored in the host buffer. Moreover, a status message similar to that depicted in Table #1 is sent from the transport offload engine to the processor.

It is then determined in decision 516 whether the tag extracted in operation 502 points to a data list that is valid. As an option, this determination may be accomplished by retrieving the data list at a location in application memory indicated by the tag extracted in operation 502. A valid data list may be determined by comparing a tag (see, for example, 406 of FIG. 4) with the tag extracted in operation 502 and also by examining a valid field (see, for example, 410 of FIG. 4) in the data list. If the data list is not valid, the data portion of the protocol data unit is stored in a host buffer. Moreover, a status message similar to that depicted in Table #1 is sent from the transport offload engine to the processor. See operation 517.

If, however, it is determined in decision 516 that the data list is valid, the operation continues as follows. In operation 518, a state of the data list is identified. As an option, the state of the data list may be identified by reviewing the state in the data list (see, for example, data list state 408 of FIG. 4).

The protocol data unit is then stored in application memory (see, for example, processor system memory 306 of FIG. 3) using the state and one or more data list entries in the aforementioned data list. Note operation 520. Specifically, an index associated with the state may be used to identify an entry in the data list where an address (see, for example, 402 of FIG. 4) may be found. To this end, such address in the data list is extracted and stored in the socket control block of the transport offload engine. In use, the address operates to identify a location in the application memory where data in a current segment of the protocol data unit (or the entire protocol data unit) is to be stored. It should be noted that, if a segment of the protocol data unit is received out-of-sequence, data in that segment may be stored in the aforementioned host buffer.

It is then determined whether the end of the data list has been reached in decision 522. If the end has not been reached, then the state in the data list is updated and the state is stored back in the data list. See operation 524. It is then determined if the end of the protocol data unit has been reached. See decision 528. If not, the process resets and is repeated until all of the segments (i.e. packets) of the protocol data unit are stored. If, however, it is determined that the end of the protocol data unit has been reached, a status message is sent from the transport offload engine to the processor. See operation 532.

Table #2 illustrates an exemplary status message format used to indicate that a complete protocol data unit has been received and stored in application memory. Such format is set forth for illustrative purposes only, and should not be considered as limiting in any manner.

TABLE #2

| Ver | SB Length | SB Code | Socket CB Handle |
|---|---|---|---|
| Protocol Data Unit Identifier | | | |

Returning now to decision 522, if it is determined that the end of the data list has been reached, the data list is retired (i.e. invalidated or discarded, etc.) in operation 526. This retiring operation may be accomplished using the aforementioned valid field (see, for example, 410 of FIG. 4) in the data list. Further, the data in the remaining portion(s) of the protocol data unit is copied to the aforementioned host buffer and a status message is sent from the transport offload engine to the processor. Note operation 530.

In the specific exemplary context of handling iSCSI protocol headers, the received iSCSI header may be parsed before the incoming protocol data unit containing the iSCSI header is written into a host buffer or application memory. An iSCSI bit in the socket control block for that connection may also be inspected to find out if the protocol data unit needs iSCSI processing. If the iSCSI bit is set, indicating the socket is an iSCSI socket, the following fields may be read from the transport offload engine and passed to an iSCSI interface. See Table #3.

TABLE #3

Cyclic redundancy checking (CRC) seed
2 Lengths (indicating the end of the header and the end of the protocol data unit)
Fixed interval marker (FIM) mask
FIM offset
Length to next header
Partial double-word (dword) (from previous protocol data units for CRC computation along with byte enable)

For iSCSI processing, it may be required that the iSCSI header parsing, fixed-interval markers (FIM) removal, and CRC checks are performed at wire speed. Such may further require that a protocol data unit is not copied to the receiver buffer or host buffer until the socket control block lookup is complete.

With respect to handling markers embedded within the protocol data units, markers may be removed by the transport offload engine irrespective of whether the incoming data contained in protocol data units is copied to host buffers or application memory.

In order to enable the host buffers anytime after the connection setup and still write to the correct offset in application memory, a particular tagging scheme may be used. In this scheme, a data list may contain a sequence number or tag starting from which, the transport offload engine may write into an address in application memory contained in a first entry of the data list.

There are two cases in which a data list is retired. Note Table #4.

TABLE #4

1. An iSCSI data-In PDU with S bit set (when the transport offload engine is receiving data as an initiator)
2. An iSCSI data-out PDU with 'X' number of F bits (where X is the number of R2Ts being serviced by the same data list - when the transport offload engine is receiving data as a target).

More information will now be set forth regarding one exemplary system with which the transport offload engine may store and use the data list state as well as the other information associated with the data list.

Figure 6:
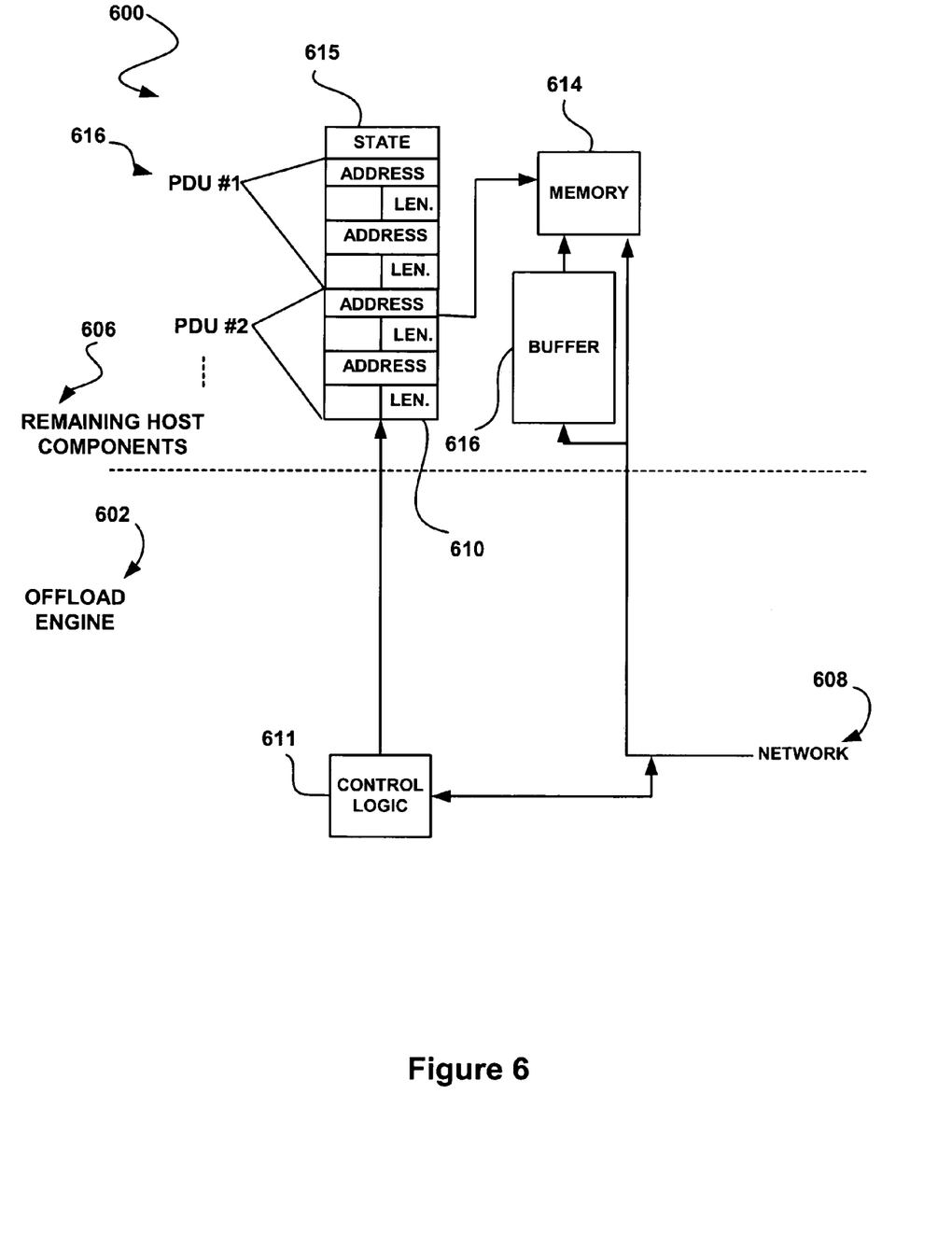
FIG. 6 illustrates an exemplary system for managing incoming protocol data units via a network, in accordance with one embodiment.

FIG. 6 illustrates an exemplary system 600 for managing incoming protocol data units in a network, in accordance with one embodiment. As an option, the system 600 may be used in the context of the disclosure of the previous figures. Of course, however, it should be noted that the system 600 may be implemented in any desired context. Most importantly, the exemplary system 600 is set forth for illustrative purposes only, and should not be considered as limiting in any manner.

As shown, the system 600 includes both a transport offload engine 602 (i.e. see, for example, transport offload engine 312 of FIG. 3), as well as components 606 of a host (see, for example, host 204 of FIGS. 2 and 3). Unlike the system of prior art FIG. 1, the transport offload engine 602 of the present system 600 does not necessarily include a TOE buffer (this is optional, i.e. less/more buffering capabilities may be included).

Instead, a host buffer 616 in memory (i.e. see, for example, processor system memory 306 of FIG. 3) may be used, as needed, in the manner set forth hereinabove.

A data list 610 [i.e. a scatter-gather list (SGL), etc.] is provided to point to various locations in application memory 614 (i.e. see again processor system memory 306 of FIG. 3) where the protocol data units are stored. The data list 610 is further provided with a stored state 615. Such state 615 may be used in conjunction with the storage of a subsequent protocol data unit for improving network communication management and performance.

Specifically, multiple protocol data units (i.e. PDUs 616) may optionally be stored using a single data list. Further, this capability is optionally provided with less (if any) buffering capabilities on the transport offload engine 602, since the stored data list state is available (along with other information) ahead of time when protocol data units are received.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An Internet small computer system interface (iSCSI) method for storing a state of a data list, comprising:
   receiving a protocol data unit including an iSCSI protocol data unit;
   identifying a data list describing how data in the protocol data unit is to be stored in memory;
   storing the data in the protocol data unit in the memory;
   storing a state of the data list, where the state of the data list is used in conjunction with storage of data in a subsequent protocol data unit; and
   extracting and storing information from a header portion of the protocol data unit in a control block;
   wherein the information stored in the control block is utilized for identifying the data list for use in conjunction with the subsequent protocol data unit such that a plurality of related protocol data units are stored using a single data list.

2. The iSCSI method as recited in claim 1, wherein the data list includes a scatter-gather list (SGL).

3. The iSCSI method as recited in claim 1, wherein the data list includes a memory-descriptor list (MDL).

4. The iSCSI method as recited in claim 1, wherein the state is stored using a transport offload engine.

5. The iSCSI method as recited in claim 1, wherein the protocol data unit includes the header portion and a data portion.

6. The iSCSI method as recited in claim 1, wherein the information includes a tag.

7. The iSCSI method as recited in claim 1, wherein the data in at least a segment of the protocol data unit is stored in a buffer if no information is extracted or if the information extracted identifies an invalid data list.

8. The iSCSI method as recited in claim 7, wherein the buffer includes a host buffer.

9. The iSCSI method as recited in claim 7, wherein the buffer includes a transport offload engine buffer.

10. The iSCSI method as recited in claim 1, wherein a valid field is used to determine whether the data list is valid.

11. The iSCSI method as recited in claim 1, wherein the data in segments of the protocol data unit are stored using the data list until an end of the data list is detected.

12. The iSCSI method as recited in claim 11, wherein the data list is retired if the end of the data list is detected prior to the data in all of the segments of the protocol data unit being stored.

13. The iSCSI method as recited in claim 11, wherein the data in the protocol data unit is stored in a buffer if the end of the data list is detected prior to the data in all of the segments of the protocol data unit being stored.

14. The iSCSI method as recited in claim 1, wherein the data in segments of the protocol data unit are stored using the data list until an end of the protocol data unit is detected.

15. The iSCSI method as recited in claim 14, wherein the state of the data list is stored if the end of the protocol data unit is detected.

16. The iSCSI method as recited in claim 1, wherein the state indicates a location in the data list.

17. The iSCSI method as recited in claim 1, wherein if the data in a segment of the protocol data unit is received out-of-sequence, the data in the segment is stored in a buffer.

18. The iSCSI method as recited in claim 1, wherein the memory includes application memory.

19. The iSCSI method as recited in claim 1, wherein the state of the data list is updated after each use of the data list so that the subsequent protocol data unit is capable of using the data list.

20. A method for storing a state of a data list, comprising:
receiving an Internet small computer system interface (iSCSI) protocol data unit;
identifying a data list describing how data in the protocol data unit is to be stored in memory;
storing the data in the protocol data unit in the memory;
storing a state of the data list, where the state of the data list is used in conjunction with storage of data in a subsequent protocol data unit; and
extracting information from a header portion of the protocol data unit and storing the information in a control block;
wherein the information stored in the control block is utilized fox identifying the data list for use in conjunction with the subsequent protocol data unit such that a plurality of related protocol data units are stored using a single data list.

21. A transport offload engine sub-system, comprising:
a transport offload engine in communication with a processor and a network, the transport offload engine for identifying a data list describing how data in a received Internet small computer system interface (iSCSI) protocol data unit is to be stored in memory, and storing a state of the data list;
wherein the state of the data list is used in conjunction with storage of data in a subsequent protocol data unit;
wherein information is extracted from a header portion of the protocol data unit and stored in a control block;
wherein the information stored in the control block is utilized for identifying the data list for use in conjunction with the subsequent protocol data unit such that a plurality of related protocol data units are stored using a single data list.

22. A system, comprising:
a processor;
a transport offload engine in communication with the processor and a network via a bus, the transport offload engine for identifying a data list describing how data in a received Internet small computer system interface (iSCSI) protocol data unit is to be stored in memory, and storing a state of the data list;
wherein the state of the data list is used in conjunction with storage of data in a subsequent protocol data unit;
wherein information is extracted from a header portion of the protocol data unit and stored in a control block,
wherein the information stored in the control block is utilized for identifying the data list for use in conjunction with the subsequent protocol data unit such that a plurality of related protocol data units are stored using a single data list.

23. A data list data structure embodied on a computer readable medium, comprising:
a data list object for describing how data in a received Internet small computer system interface (iSCSI) protocol data unit is to be stored in memory;
wherein the data list object has stored associated therewith a state of the data list object that is used by a transport offload engine during storage of data in a subsequent protocol data unit;
wherein information is extracted from a header portion of the protocol data unit and stored in a control block;
wherein the information stored in the control block is utilized for identifying the data list object for use in conjunction with the subsequent protocol data unit such that a plurality of related protocol data units are stored using a single data list object.

24. A method for use in association with a transport offload engine, comprising:
receiving an Internet small computer system interface (iSCSI) protocol data unit, the protocol data unit including a header portion and a data portion;
extracting information from the header portion of the protocol data unit, the information including a tag;
determining whether to store data in the protocol data unit using a buffer or a data list based on the information;
if it is determined that the data in the protocol data unit is to be stored using the buffer:
storing the header portion of the protocol data unit in the buffer, and
sending a status message to a processor; and
if it is determined that the data in the protocol data unit is to be stored using the data list:
identifying the data list based on the information, the data list describing how the data in the protocol data unit is to be stored in memory,
identifying a state of the data list,
storing the data in segments of the protocol data unit in the memory based on the state,
repeating the storing until all of the data in the segments of the protocol data unit are stored, and
if all of the data in the segments of the protocol data unit are stored, storing the state of the data list;
wherein the state of the data list is used in conjunction with the storage of data in a subsequent protocol data unit;
wherein the information from the header portion of the protocol data unit is stored in a control block;
wherein the information stored in the control block is utilized for identifying the data list for use in conjunction with the subsequent protocol data unit such that a plurality of related protocol data units are stored using a single data list.

25. The method as recited in claim 24, wherein the buffer includes a host buffer.

26. The method as recited in claim 24, wherein the buffer includes a transport offload engine buffer.

27. An Internet small computer system interface (iSCSI) method, comprising:
receiving a protocol data unit including an iSCSI protocol data unit;
storing at least a portion of the protocol data unit in memory;
storing a state, where the state is used in conjunction with handling of a subsequent protocol data unit; and
extracting information from a header portion of the protocol data unit and storing the information in a control block;
wherein the information stored in the control block is utilized for identifying a data list for use in conjunction with the subsequent protocol data unit such that a plurality of related protocol data units are stored using a single data list.

* * * * *